US012629880B2

(12) United States Patent
Antony et al.

(10) Patent No.: US 12,629,880 B2
(45) Date of Patent: May 19, 2026

(54) SYSTEM AND METHOD FOR IN-MOULD LABELLING

(71) Applicant: Cargill, Incorporated, Wayzata, MN (US)

(72) Inventors: Denzil Kuriaparambil Antony, K.T. Industrial Park (IN); Sekhar Pal, Gurgaon (IN)

(73) Assignee: Cargill, Incorporated, Wayzata, MN (US)

( * ) Notice: Subject to any disclaimer, the term of this patent is extended or adjusted under 35 U.S.C. 154(b) by 873 days.

(21) Appl. No.: 17/427,693

(22) PCT Filed: Jan. 31, 2020

(86) PCT No.: PCT/US2020/016173
§ 371 (c)(1),
(2) Date: Aug. 2, 2021

(87) PCT Pub. No.: WO2020/160447
PCT Pub. Date: Aug. 6, 2020

(65) Prior Publication Data
US 2022/0126499 A1 Apr. 28, 2022

(30) Foreign Application Priority Data
Feb. 2, 2019 (IN) .............................. 201911004187

(51) Int. Cl.
*B29C 49/24* (2006.01)
*B29C 49/42* (2006.01)
(Continued)

(52) U.S. Cl.
CPC .......... *B29C 49/2408* (2013.01); *B29C 49/24* (2013.01); *B29C 49/42073* (2022.05);
(Continued)

(58) Field of Classification Search
CPC ..... B29C 49/2408; B29C 49/06; B29C 49/24; B29C 49/4205; B29C 2049/2412;
(Continued)

(56) References Cited

U.S. PATENT DOCUMENTS 707,279 A * 8/1902 Sweet ................... B28B 7/0014
249/105
4,616,992 A * 10/1986 Oles ......................... B65C 3/00
425/522
(Continued)

FOREIGN PATENT DOCUMENTS

EP 0867268 A1 9/1998

OTHER PUBLICATIONS

English translation of JPH11156927A (Year: 1999).*

*Primary Examiner* — Galen H Hauth
*Assistant Examiner* — Baileigh Kate Darnell

(57) ABSTRACT

The present invention relates to a system and method for in-mould labelling of articles. In particular, the present invention pertains to a system and method for in-mould labelling of multiple labels on two or more adjacent surfaces of a container (102) with polygonal cross-section. The present invention provides a combination of mould formation coupled with a design for magazine and robotic arm (606) to enable simultaneous application of multiple in-mould labels across multiple surfaces of a polygonal container (102) with minimal dead space between the labels. Simultaneous application of multiple labels and the preform inside the mould opening as per the present invention reduces cycle time and increases output efficiency.

11 Claims, 8 Drawing Sheets

(51) Int. Cl.
*B29K 67/00* (2006.01)
*B29L 31/00* (2006.01)

(52) U.S. Cl.
CPC ............................ *B29C 49/42093* (2022.05);
*B29C 2049/2412* (2013.01); *B29C 2049/2443*
(2013.01); *B29C 2049/2483* (2013.01); *B29K*
*2067/003* (2013.01); *B29L 2031/7158*
(2013.01)

(58) Field of Classification Search
CPC .... B29C 2049/2443; B29C 2049/2483; B29C
2049/0715; B29C 31/00; B29C 31/002;
B29C 31/04; B29C 31/08; B29C 31/085;
B29K 2067/003; B29L 2031/7158
See application file for complete search history.

(56) References Cited

U.S. PATENT DOCUMENTS

| | | | | |
|---|---|---|---|---|
| 4,992,038 | A | 2/1991 | Furuse | |
| 2011/0070388 | A1* | 3/2011 | Schneider | ........... B29C 49/0005 |
| | | | | 425/526 |
| 2011/0183028 | A1 | 7/2011 | Popp | |
| 2018/0001540 | A1* | 1/2018 | Byun | ..................... B29C 49/24 |

* cited by examiner

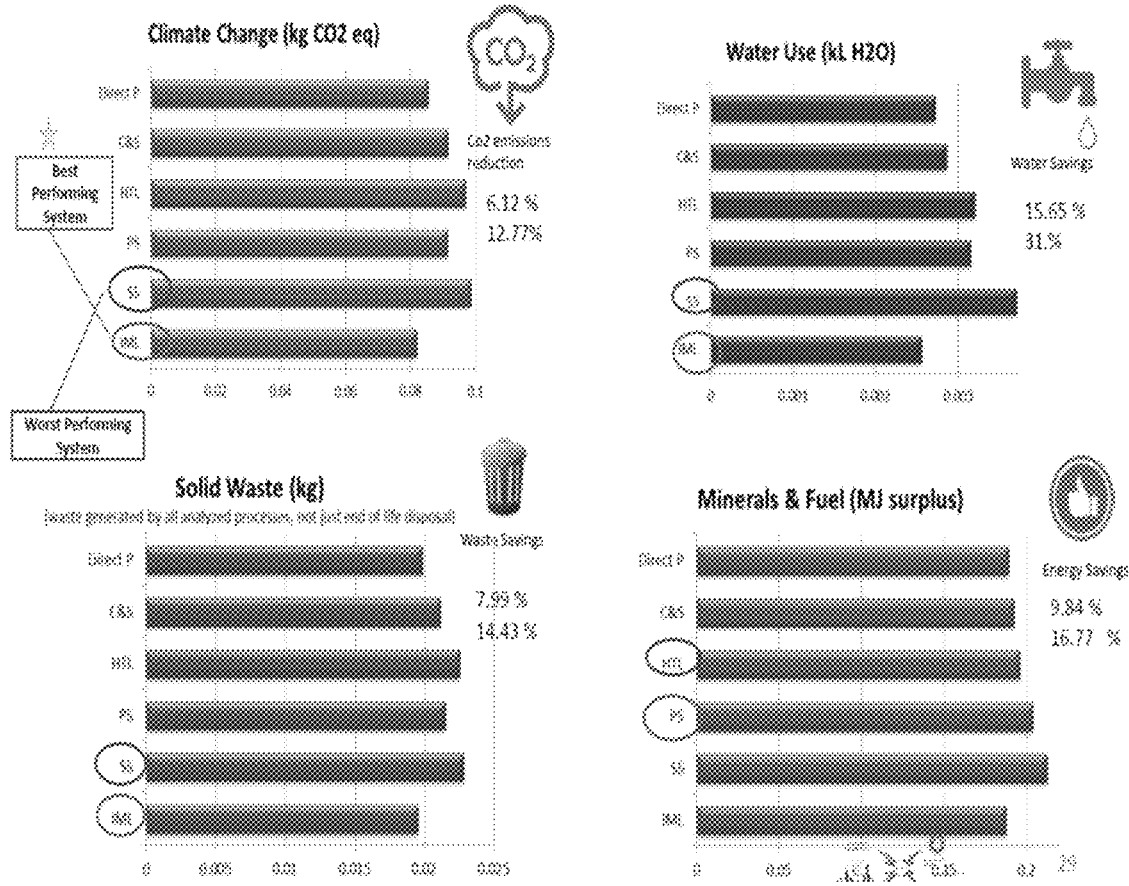
FIGURE 1-- Prior Art--

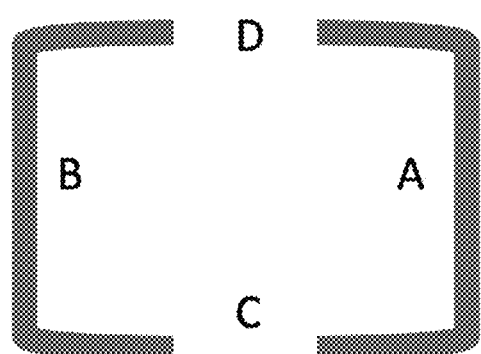
FIGURE 2A-- Prior Art--
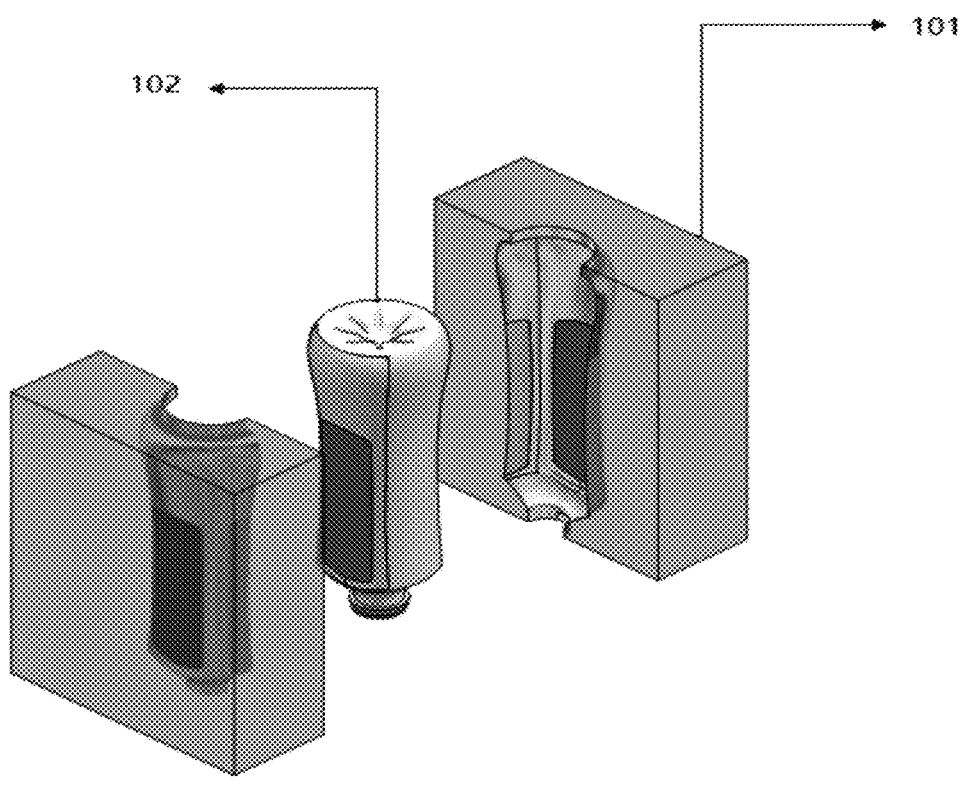
FIGURE 2B-- Prior Art--

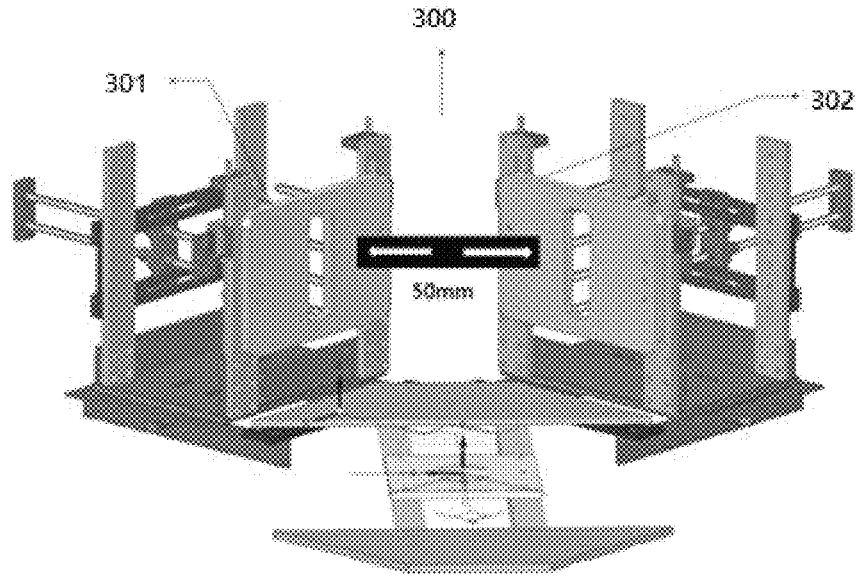
FIGURE 4-- Prior Art--

510

512

402

401

SYSTEM AND METHOD FOR IN-MOULD LABELLING

CROSS REFERENCE TO RELATED APPLICATIONS

This application is a national phase application of PCT/US2020/016173, filed 31 Jan. 2020, which claims the benefit of Indian Provisional Application No. 201911004187, filed 2 Feb. 2019, which are hereby incorporated by reference in their entirety.

FIELD OF THE INVENTION

The present invention relates to a system and method for in-mould labelling of articles.

BACKGROUND OF THE INVENTION

Most consumable products and food items, whether solid or liquid, are stored in food-grade liquid-tight containers typically made of polymeric materials. Generally, these containers are formed by thermoforming, blow moulding or injection moulding of multi-layered polymeric material which typically consists of a polypropylene, polyethylene, or PET layer to obtain a rigid container body. With such use of polymeric containers, it becomes essential to apply labels which can not only be applied on these containers but can also last usage of the container. A label could include information about the product, ingredients, brand, etc. A label can made out of paper, plastic film, cloth, metal, print, etc. One common type of label that is used is a paper label. Use of paper label, however, has inherent problems in that when the polymeric container cools, the polymer and paper have different rates of shrinkage and, as a result, the paper wrinkles and stresses occur in the adhesive. Plastic labels are more durable and preferred over paper label.

To affix labels, including plastic labels, on containers of products, there are various processes/methods of application thereof, such as manual application, shrink sleeve, label through applicator, direct printing, in-mould labelling, etc. In manual application, a plain label or a label with an adhesive on it is pasted onto the container. This often results in problems of misalignment or inconsistent application. This method also brings along with it a higher chance of contamination, especially in the case of food products. Manual application is not only cumbersome, but it also has low accuracy, low output; and is less cost effective. Labels often wrinkle in this process making the product and its container look unappealing, losing its shelf appeal and brand image. In shrink sleeve technique, which is now banned in many countries owing to the plastic waste notification and its carcinogenic properties, PVC material is used to label the product. It is wrapped around the container and tunneled through heat so that it may acquire the shape and contour of the container. This method usually requires substantial use of heat with certain post manufacture handling. This application process often results in the profile of the container getting masked. In the method of labelling through applicator, a self-adhering label is applied using a label machine on two sides of a container, usually the front and back, which process offers some protection to the container itself. There are certain limitations to using this method to apply the label on all four sides since only two sides can be pasted simultaneously at a time. Once the front and back label are pasted, the product's container then passes through the applicator again for its other two sides to be labelled, which often results in change of alignment. In self-adhesive paper type labels, the glue therein is protected using a backing substrate/liner, more than 60% of which ends up in landfills, making it eco-hazardous. Also, time is required to release gas out and settle bottle shrinkage to prevent bubbling and wrinkling. Labels through applicators are not waterproof, cannot be recycled with the container and collects dust easily making it unhygienic. While direct printing of label does not face such issues, it requires additional infrastructure to treat the container surface for printing, making it more expensive. It is time consuming and desired results are limited by print colour, print registration and container substrate.

It has been found in prior art that applying the labels during the moulding process of the polymer reduces costs of manufacture and produces an attractive container. More specifically, when a hollow preform is expanded against the surface of the mould having a label on a side wall of the mould cavity so that when the plastic is expanded, it causes an adhesive on the label to be heated and thereby adhere the label to the container. This is essentially called in-mould labelling (IML). In this in-mould labelling process, label is applied with the help of robotic arm in between the mould and the label is fused with molten plastic to become integral part of container and is difficult to peel off. This is currently a preferred method in packaging industry due to its numerous advantages. This process does not require any post labelling process, and the label gets fused with the same heat with which container is made, thereby requiring no extra heat/energy. Effectively, in-mould labelling eliminates the need for a separate labelling process following the manufacture of the container, which reduces labour and equipment costs. Also, it gives an enhanced product look & durability without any flagging & wrinkles on labels. This is an eco-friendly process, which reduces waste & $CO_2$ emission, and saves water & energy.

In-mould labels generally comprise a carrier base, consisting of a polymeric or biopolymeric carrier film, on which a decorative pattern or a written message is printed. The label is positioned against a wall of a mould for injection moulding or blow moulding, and held in place by various means, such as electrostatic forces or vacuum suction, and a polymeric article is moulded by injecting a mass of polymeric melt or by blowing a polymeric preform against the mould walls on which the in-mould label is applied. This causes the label to join the moulded article and can be regarded as an integral part of it. In-mould labels can be used to cover a portion of a container, or in cases of cylindrical containers, can cover the entire outer surface of a container. In the latter case, the in-mould label serves as an additional layer and may, therefore, enhance the structural integrity of the container.

FIG. 1 shows a comparative chart of different properties [such as carbon-di-oxide emission, usage of water, solid waste generation, and amount of fuel required] of the different methods of label application.

Conventionally, the in-mould labelling in blow moulding machines is typically performed by inserting a label or a set of labels within the mould prior to the extrusion of the hot plastic preform tube and subsequent closing of sections of the mould in preparation for the blowing operation. The subsequent blowing operation forms the hot plastic tube around the label to the shape of the mould. This sequential process of first inserting and placing labels inside the mould and thereafter inserting the pre-form in the mould cavity, however, increases the time duration of each cycle, and reduces the overall output of the machine.

As per the prior art, in-mould label dispensers for blow-moulding machines conventionally include a label carrier to receive a label from a label magazine and then are moved to deposit the label within the mould cavity. There are many methods of picking labels from magazine and depositing them inside the mould and holding them on the moulds, such as by use of vacuum. Termination of a vacuum drawn at the suction cups allows a vacuum drawn at the mould cavity to secure the label in position in preparation for the moulding. Such vacuum carriers are usually mounted on pivotal arms that move in with respect to the direction of opening and closing movement of mould sections of the mould in order to permit depositing of the labels in the confined space permitted by the extent of the mould opening. These type of label carrier, however, are capable of depositing only one label within the mould at a given time since movement thereof on the pivotal arm toward one mould section interferes with pivotal movement of a similar arm towards the opposite mould section for depositing another label. Another prior art type of in-mould label dispenser includes a label carrier that is moved along an abruptly curved path by a complex linkage which executes a 180 degree turn in order to transfer labels from a label magazine to the mould in preparation for moulding. With this complex linkage type label dispenser, it is likewise not possible to deposit more than one label in the mould at a given time due to the limited space present upon opening of the mould. As a result, the in-mould labelling mechanisms for blow moulding machines known in the prior art have an increased cycle time.

In some of the cases in the prior art it is possible to place a label on both the moulds at the same time to reduce cycle time. In these cases, however, it is still not possible to launch more than one label on each mould, thereby limiting the total number of labels on the container two labels which are placed at diametrically opposite surfaces of the bottle. Placing of more than two labels would require multiple operations of the label carrier, thereby further increasing the cycle time. Multiple operations of the label carrier inside the mould opening for placing more than one label on a single mould piece also increases the chances of misalignment and thus the waste output of the machine.

These problems are particularly pronounced during blow-mould manufacturing and in-mould labelling of non-cylindrical container bottles, viz. bottles having polygonal shape of the cross-section of the body and having multiple flat surfaces, such as cube or cuboidal shape of body. In these case of containers with polygonal body, it is not possible to apply label at the curving edges of the bottle by way of in-mould labelling. In a case of regular cuboidal shaped body of container having four rectangular shaped surfaces in the final product which are disposed at an angle of 90° to each other, the conventional methods available in prior art provides labelling of only one set of two diametrically opposite surfaces. The reason for this is two-fold. Firstly, the mould pieces in such cases are casted such that the dissection of the mould is across one set of two opposite surfaces, as shown in FIG. 2A. Owing to such arrangement, it is not possible to put label by in-mould labelling on the sides C & D (FIG. 2A) of final container, as the mould is cut across these sides, and it is not possible to places labels on these sides during the open position of the moulds and to keep them intact when the moulds are closed for performing the blow moulding. Therefore, the only surfaces that are being available for putting the labels are A and B in this case. It is more evident from the FIG. 2B, wherein the in-mould labelling method is applied only on one pair of diametrically opposite surfaces. In this case the container is divided into two parts across the face of the 2 sides of the container (102), and it is possible to apply labels only on the front and back of the container according to the mould design (101) as shown in. This model of mould dissection is not only preferred but recommended in the conventional methods since only one label could be applied inside one mould, and it is preferable to have the side not at an angle to the label applicator. Secondly, the magazine used in conventional methods for holding each labels has a minimal outer surface which translates into a minimum dead space between the labels. This is evident from the conventional magazine design in FIG. 4. As is evident from the positioning of label holders 301 and 302 in FIG. 4, the dead space is typically 50 mm. Accordingly, owing to the minimum dead space between the two set of labels to be picked from the magazine and launched inside the moulds, the conventional methods do not permit placement of more than one label on each mould piece in the open position. This is particularly true for smaller size bottles, where mould opening space is limited, and the conventional designs of label carrier and placements of labels on magazines do not permit placement of multiple labels. Furthermore, in the existing machines, the pre-form is always inserted inside the mould space only once the label carrier has exited the mould cavity after placing the labels. This multi-step process adds to the cycle time, and thereby decreasing output. Attempt to insert the preform while the label is being placed, particularly while placing a label on each of the two mould pieces simultaneously in open position is likely to disturb the preform.

OBJECTS OF THE INVENTION

The primary objective of the present invention is to provide a system and method for in-mould labelling of multiple labels on two or more adjacent surfaces of a container with polygonal cross-section.

Another objective of the present invention is to provide a system and method for in-mould labelling of multiple labels with dead space of less than 05 mm across a single or multiple adjacent surfaces.

Yet another objective of the present invention is to provide a system and method for in-mould labelling wherein it is possible to simultaneously apply multiple labels across all surfaces of a container with polygonal cross-section. In particular, a system and method for in-mould labelling across all four sides of a cuboidal container.

Still another objective of the present invention is to provide a system and method for in-mould labelling wherein multiple labels are simultaneously placed inside the moulds without disturbing the concurrent process of insertion and placement of preform inside the mould cavity, thereby reducing the cycle time.

Another objective of the present invention is to provide a system and method for in-mould labelling of multiple labels with high output efficiency and reduced costs of production.

Another objective of the present invention is to provide a system and method for in-mould labelling wherein the labelling produces less waste, and is more environment friendly, cost-effective, accurate, efficient, and producing more aesthetic products with low cost.

The other objects, preferred embodiments and advantages of the present invention will become more apparent from the following detailed description of the present invention when read in conjunction with the accompanying examples, figures and tables, which are not intended to limit scope of the present invention in any manner.

SUMMARY OF THE INVENTION

The present invention provides a system for in-mould labelling of a plurality of labels to an article, the system comprising: (a) a first mould piece (210) and a second mould piece (212) movable to a closed position and an open position, wherein both the mould pieces are casted in a manner such that in the closed position, the inside of the mould constitutes the outer shape of the article, and in the open position, any surface of the article on which a label is to be applied remains intact within a single mould piece; (b) a preform adjuster and installer mechanism to constantly transport, feed and place a preform in the center of mould cavity during the open position of mould in each cycle; (c) a magazine unit (400) comprising first label magazine (401) to hold labels for first mould piece (210), and second label magazine (402) to hold labels for second mould piece (212), wherein the first label magazine (401) and second label magazine (402) are connected by a common base to ensure a fixed relative positioning, and wherein each label magazine (401, 402) comprises a plurality of label clasping mechanisms (401a, 401b, 402a, 402b) protruding from them, and each such protruding label clasping mechanism holds a label rim (404, 405, 406, 407) at the end and wherein the length and direction of each label clasping mechanism within a label magazine is configured such that the relative positioning of the front labels of all the respective rims inside a label magazine matches the desired relative positioning of these labels inside the respective mould piece; (d) a robotic arm (606) for picking labels from the magazine unit and placing them inside the mould pieces during the open position, wherein the robotic arm comprises a label picker unit (500) with a plurality of channels (510, 512) wherein each channel has a freedom of back and forth movement along the axis of a label magazine (401, 402) to a mould piece (210, 212), wherein the total width of the travel of all the channels (510, 512) is less than the width of mould opening such as to allow the entry of all channels inside the mould at the same time; (e) gripper units (520, 522) mounted at the end of each channel (510, 512) such that the multiple gripper surfaces (701, 702, 703, 704) of each gripper unit are equipped and configured to pick multiple labels, one each from the multiple rims of labels in the respective label magazine, in a manner such that the relative positioning of labels stays intact not only during picking of the label but also during travel of the channel from back to forth position inside the mould opening, and also while placing the labels on the inner surface of the mould piece; (f) a blowing machine (601) to enable blowing from preform through the cavity during closed position of the moulds; wherein, the axis of movement of channels is selected such that the channels and the labels maintain a distance from the preforms in the assembly line as well as inside the mould, such as to enable simultaneous placement of multiple labels and the preform inside the mould.

The present invention also provides a method for in-mould labelling of a plurality of labels to an article, the method comprising: (a) casting a first mould piece (210) and a second mould piece (212) in a manner such that in the closed position, the inside of the mould constitutes the outer shape of the article, and in the open position, any surface of the article on which at least one label is to be applied remains within a single mould piece; (b) placing the mould pieces inside a blow-moulding machine for the opening and closing of the mould during each cycle at a pre-adjusted frequency and width of mould cavity; (c) placing a preform inside the mould during the open position of the mould in each cycle such that the air can be blown through the preform during the closed position of the mould; (d) arranging the direction and configuration of the label clasping mechanisms (401a, 401b, 402a, 402b) inside the label magazine (401, 402) such that relative positioning of the front labels of all the respective rims inside a single label magazine matches the desired relative positioning of these surfaces inside the respective mould piece on which the labels are to be applied. (e) arranging the direction and positioning of gripper surfaces of the gripper units (520, 522) such that the relative positioning of labels stays intact during picking of the label by gripper units from the label rims inside the label magazine; (f) mounting the gripper units on channels (510, 512), wherein the channels have a freedom of back and forth movement along the axis of a label magazine (401, 402) to a mould piece (210, 212); (g) positioning the channel inside the magazine for picking up one front label from each label rim inside the magazine unit onto the plurality of gripper surfaces of gripper units; (h) moving the channels for carrying the gripper units with labels to inside the mould opening and positioning against the corresponding surface of the mould pieces which are to be labelled; (i) transferring the labels from the gripper units to the inside surface of the mould pieces; (j) moving the channels with gripper units back to the magazine for the picking labels for the next cycle; (k) closing the moulds and blowing hot air through the proform; and (l) opening the moulds to let the formed container with in-mould labelling move out of the mould space; wherein the total width of the travel of all the channels (510, 512) is less than the width of mould cavity such as to allow the entry of all channels inside the mould at the same time; and wherein the placement of labels as well as placement of the preform inside the mould happens simultaneously in each cycle; and wherein, the axis of movement of channels is selected such that the channels and the labels maintain a distance from the preforms in the assembly line as well as inside the mould, such as to enable simultaneous placement of multiple labels and the preform inside the mould.

BRIEF DESCRIPTION OF THE DRAWINGS

A general understanding of the invention with its foregoing and other objects will be apparent upon consideration of the following detailed description read in conjunction with the accompanying drawings.

FIG. 1 is a comparative chart showing the properties of the conventional methods of label application on containers namely (i) manual application; (ii) shrink sleeve; (iii) label through applicator; (iv) direct print; (v) heat transfer labels; and (vi) In-mould labeling.

FIGS. 2A and 2B shows mould design (101) according to the conventional in-mould labelling method.

FIG. 4 shows the magazine unit (300) of the conventional IML mould labelling system.

DETAILED DESCRIPTION OF THE INVENTION

Accordingly, while carrying out the above objects, the present invention provides a system and method for in-mould labelling which is devoid of the drawbacks/problems in the prior art systems and methods of in-mould labelling, as identified above.

In accordance with a preferred embodiment of the present invention, the in-mould labelling process is carried out by way of two stage blow-moulding process against the conventional method of single stage blow-moulding process. In the two-stage blow-moulding process, a preform is either prepared or sourced separately and fed into the blow-moulding machine. Typically, in the two stage process, the pre-form is manufactured separately, and is in solid form instead of molten or semi-molten form when it is inserted in the mould.

In another preferred embodiment, polyethylene terephthalate (PET) is used to manufacture the containers using two-stage blow-moulding technique for in-mould labelling. PET is lightweight, easily usable, and economical to the manufacturer and consumer, apart from being environment-friendly as opposed to the other materials. For polymers like PET, Polypropylene (PP) and others, the two-stage blow-moulding process is preferred. In this process, a first stage concerns the production of a preform, for example by injection or compression. A second stage concerns the blowing of preforms to obtain the finished bottles or containers. The two-stage blow-moulding process results in improved overall qualities of the container, such as mechanical qualities, barrier qualities etc. Conventionally, the in-mould labelling is carried out using single-stage blow-moulding, which has larger cycle time. While the present invention also works with single-stage blow-moulding process, the cycle time and output efficiency of the process may vary.

Figure 3A:
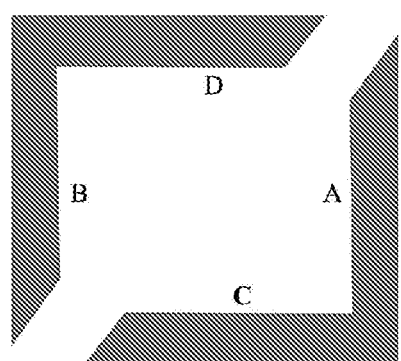
FIGS. 3A and 3B shows L-shaped mould design (201) according to the present invention.
Figure 3B:
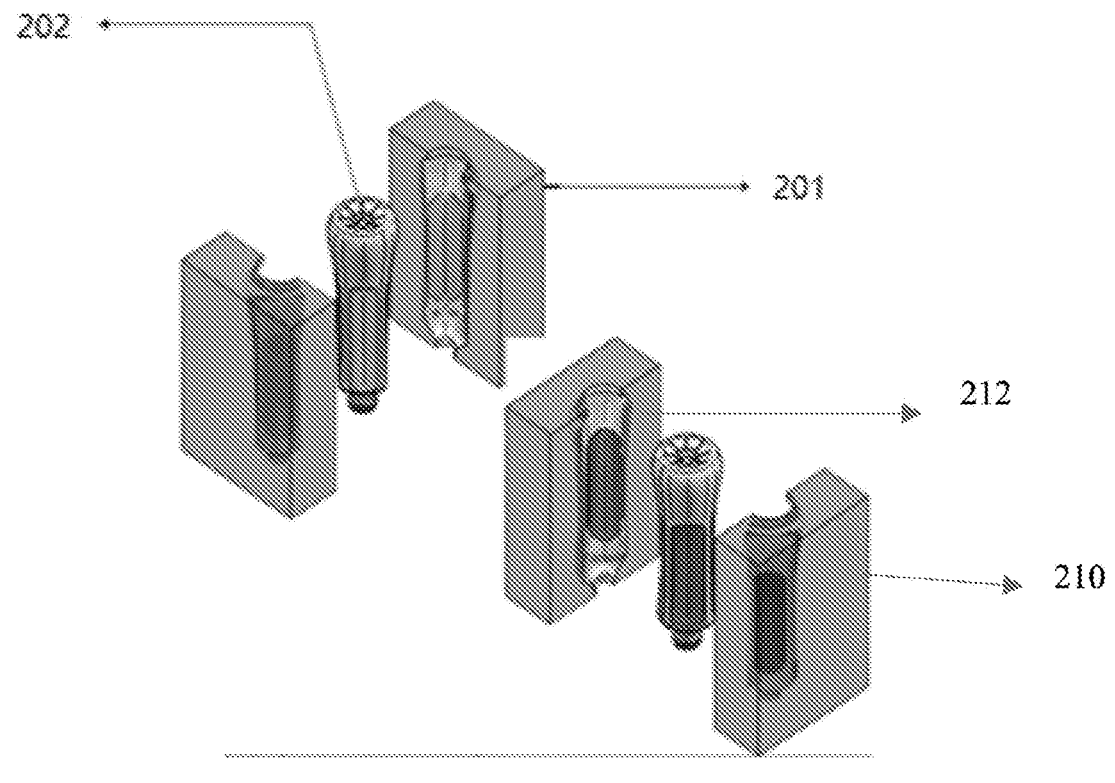

In accordance with a preferred embodiment of the present invention, in-mould labelling of multiple labels on all sides of a four-sided bottle is carried out using a mould which is casted in a manner such that it enables labelling on all sides. A mould usually comprises a set of mould pieces—a first mould part and a second mould part—wherein the first and second mould parts, when combined (viz. in closed position), define a mould cavity with an inner shape corresponding to the outer shape of the article to be formed in the mould. The first and second mould parts, however, are dissected along an axis of the bottle to open the moulds. In accordance with the present invention, for in-mould labelling of all four sides of a container, the mould is dissected along the diagonal axis of the container instead of longitudinal axis line such that the parting line moves away from all flat surfaces which can be labelled. Thus the moulds are casted in a manner such that any surface of the article on which at least one label is to be applied remains within a single mould piece. The moulds casted in such case, therefore, are two "L" shaped moulds (see FIG. 3A) instead of conventional '[' shaped mould (see FIG. 2A). Likewise, in bottles having the cross-section of the body in the shape of a hexagon (viz. six sides) or a parallelogram (viz. four sides but not at an angle of 90°) or any other polygonal shape for that matter, the moulds can be casted in a manner such that the dissection is along the diagonal or edges such that all flat surfaces remain intact and no such surface is dissected into separate mould pieces. Since neither it is desirable, nor possible to apply labels through in-mould labelling at the edges of a polygonal bottle, the edges remains unlabelled and thus can be used as parting lines for the moulds. This enables labelling of all the surfaces of a polygonal bottle. For instance, in the FIG. 2A (top view of the open position of moulds as per the prior art) surfaces C & D cannot be labelled as they are not intact during the open position of the mould when the labels are placed inside the mould. Whereas in the FIG. 3A (top view of the moulds as per the present invention), all surfaces (A, B, C & D) are intact in the open positions of the moulds, and thus can be labelled. Accordingly, as evident from FIG. 3B, each mould piece (210, 212) is equipped to receive 2 labels each at an angle of about 90°, thereby enabling labelling of all four sides of the container. Not only the application of in-mould labels on all four sides of a container is not achievable using the mould formation of the prior art, the prior art actually teaches away from such form of mould formation because it was not possible to apply two labels within the same mould piece, particularly at an angle of 90° and close to each other, which would be required for the mould formation of the present invention. The present invention will also work with the use of more than two mould pieces during the blow-moulding process.

Figure 5A:
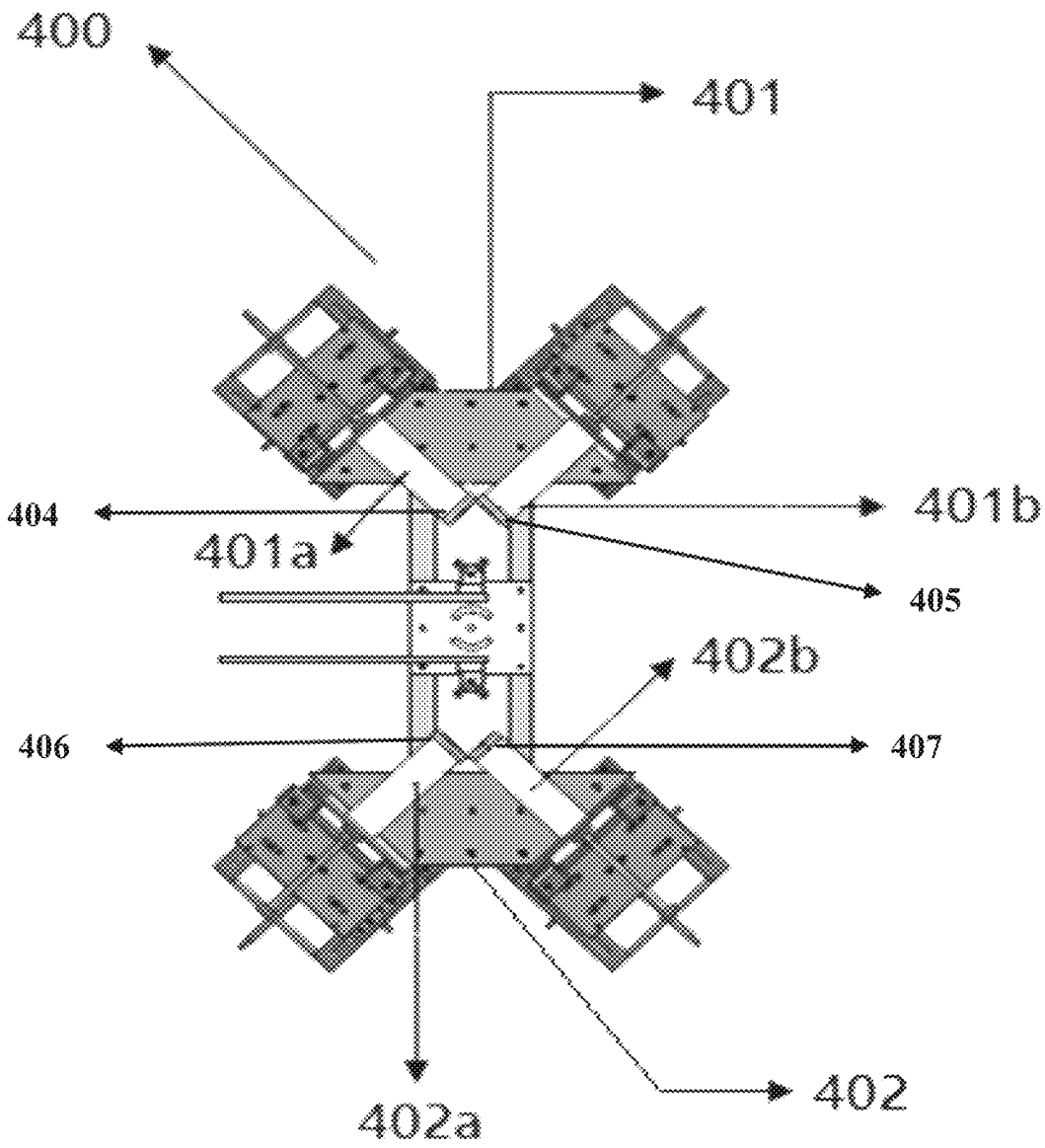
FIG. 5A shows the top view of the magazine unit (400) and FIG. 5B shows a perspective view of the magazine unit (400) in accordance with the present invention.
Figure 5B:
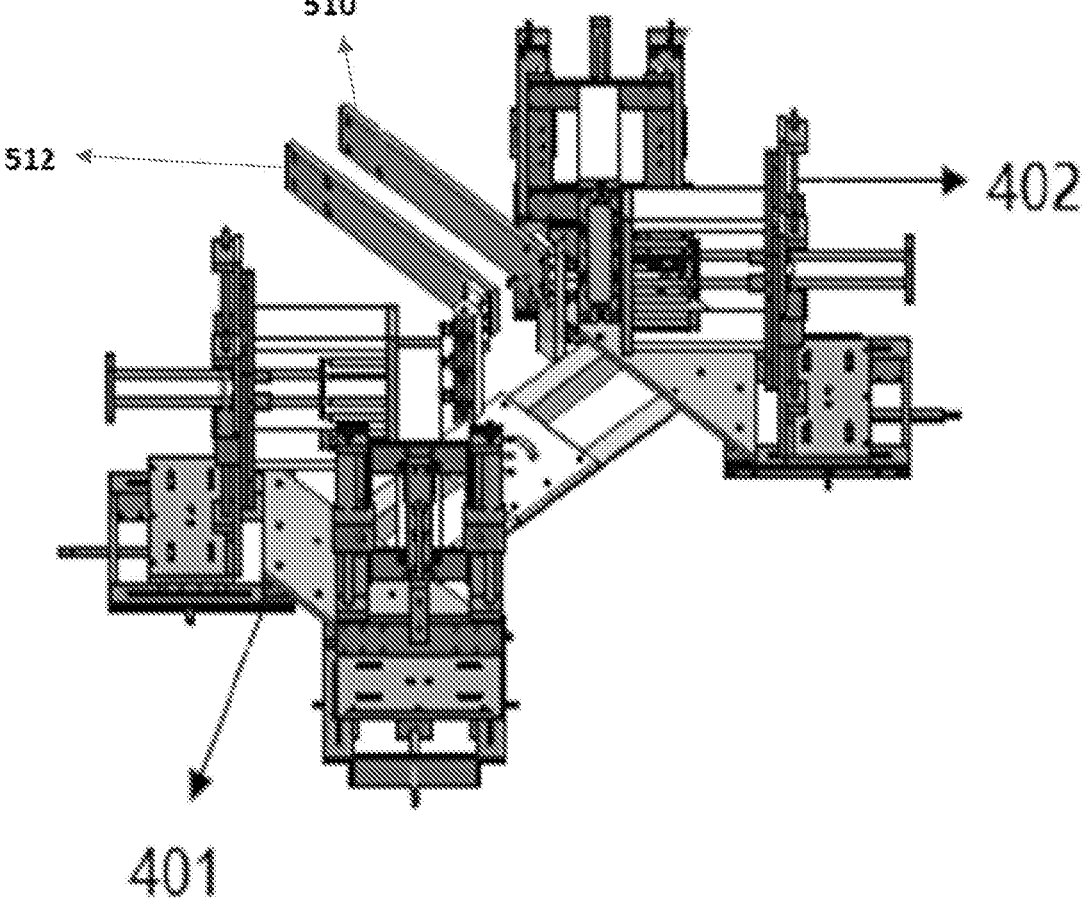
Figure 6A:
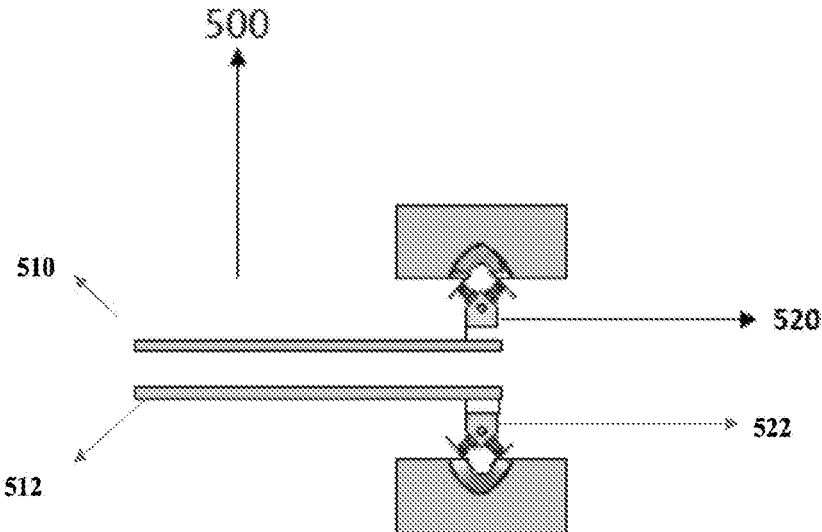
FIG. 6A shows a top view of the label picker unit (500) and FIG. 6B shows a perspective view of the label picker unit (500) in accordance with the present invention.
Figure 6B:
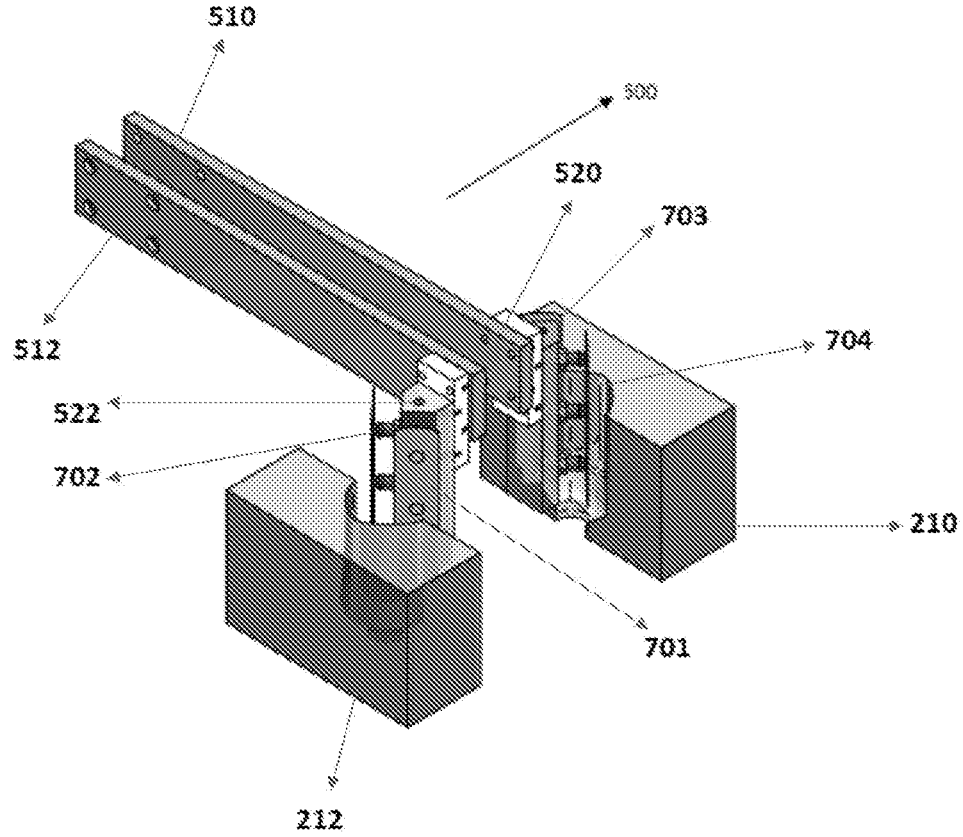

In another preferred embodiment of the present invention, the in-mould labelling of multiple labels across multiple surfaces of a polygonal container is enabled by deploying a unique magazine formation which enables multiple labels to be picked simultaneously with minimum or no dead space between them. As per FIGS. 5A and 5B, the magazine unit (400) of the present invention comprises a first label magazine (401) and a second label magazine (402). The first label magazine (401) hold labels for first mould piece (210), and second label magazine (402) to hold labels for second mould piece (212). The first label magazine (401) and second label magazine (402) are connected by a common base to ensure a fixed relative inter-se positioning throughout the process. The first label magazine (401) comprises two protruding label clasping mechanisms (401a, 401b), and the second label magazine (402) comprises two protruding label clasping mechanisms (402a, 402b). Each of these protruding label clasping mechanisms (401a, 401b, 402a, 402b) hold a rim of label at their end (404, 405, 406, 407). For instance, the label clasping mechanisms 401a holds the rim 404. The positioning of the label magazines (401, 402) as well as the length and direction of protrusion of each label clasping mechanism is configured in a manner such that the relative positioning of the front labels of each rim inside a label magazine is configured to match the relative positioning in which these labels are to be placed inside the respective mould piece. For instance, in case of a square container where the requirement is to put a label across all four surfaces, the L shaped mould as per the present invention will have two surfaces for labelling which are disposed at 90° to each other. In such case, the front labels of the rims in the label magazine will also be configured in a similar L shape, such that they are picked up as is and placed inside the mould. In this manner, when the rims are being held by way of protruded clasping mechanisms, the dead space between the two labels which are to be applied on two surfaces of an L shaped mould can be less than 5 mm, and the dead space for two labels to be applied on the same surface can be nil. This was not possible in the conventional magazines where the space around each label is necessary to hold the cut-out labels inside the magazine, which space would eventually translate into dead space between the labels inside the mould. It is to be noted that if the conventional magazine units (301 and 302) are placed at an angle of 90° to each other, typically a dead space of 50 mm is generated owing the arrangement of magazines (see FIG. 4) which is likely to exceed the width of the container, making it impossible to apply the labels at all four sides of container. In accordance with the present invention, since the front labels of each adjacent rim are placed in such close proximity, the dead space can be minimized or avoided altogether. This enables placement of multiple labels on a single surface or all surfaces of all sized bottles, including small sized bottles.

Furthermore, as per another preferred embodiment of the present invention, a robotic arm is deployed which enables transfer of labels from the magazine to the inside of the mould in a manner such that multiple labels can be picked, transferred, and placed inside the mould without disturbing the relative positioning of the labels, as well as without disrupting the simultaneous transport, feeding or final placement of preform inside the mould opening. As per the present invention, the robotic arm (606) picks labels from the magazine unit and place them inside the mould during the open position of the mould. In a preferred embodiment of the present invention, the robotic arm comprises a label picker unit (500) with two channels (510, 512). The first channel (510) has a freedom of back and forth movement along the axis of a label magazine (401) to a mould piece (210) such that the channel can pick up a label and deliver it to the mould piece during the open position of the mould. The total width of the travel of all the channels (510, 512) is less than the width of mould opening such as to allow the entry of all channels inside the mould at the same time. Since the mould opening space is limited, usually no more than 250 mm, the width of the channels is kept lower, usually less than 220 mm.

Figure 7:
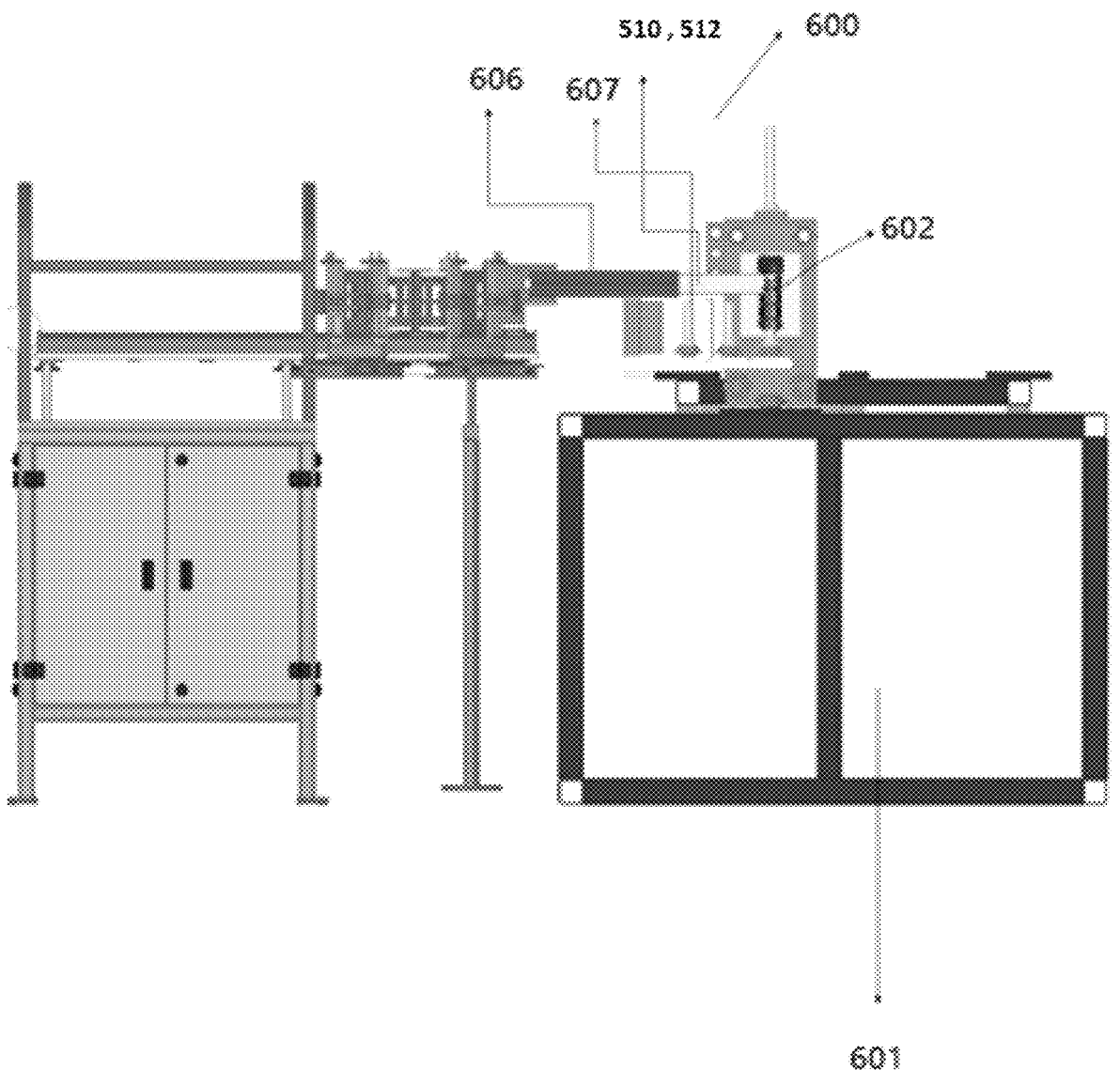
FIG. 7 shows a perspective view of the device/system (600) as disclosed in the present invention.

In another preferred embodiment of the present invention, the axis of movement of channels is selected such that the channels and the labels maintain a distance from the preforms in the assembly line as well as inside the mould, such as to enable simultaneous placement of multiple labels and the preform inside the mould. Since the preform is usually placed at the blowing side (or mouth) of the container, it is preferable to have the axis of movement of channels at the non-blowing side of the container. Also, since the preform is placed right in the middle of the mould opening, it is preferable that the axis of movement of the channels is off-center to avoid any contact of the channel or the labels with the preform. This arrangement leaves space in the middle for the travel and placement of the preform inside the mould while the labels are being placed. Therefore, the distance between the two channels is usually kept more than the width of preform. In another preferred embodiment of the present invention, the channels are above the height of the preform, see FIG. 7. This process of simultaneous labelling of the labels inside the mould and placement of the preform at the center of the mould space reduces the cycle time drastically, and increase the efficiency and output of the machine. Furthermore, use of single robotic arm (instead of multiple robotic arms) for placement of multiple labels reduce the scope of misalignment.

In accordance with a preferred embodiment of the invention, at the end of first channel (510) is mounted a gripper units (520) and at the end of second channel (512) is mounted a second gripper unit (522). The first gripper unit (520) has two gripper surfaces (701, 702) and the second gripper unit (522) has two gripper surfaces (703, 704). Direction and configuration of each of these gripper surfaces (701, 702, 703, 704) is such that they are equipped to pick one label each from the multiple rims of labels in the respective label magazine in a manner such that the relative positioning of labels stays intact not only during picking of the label but also during travel of the channel from back to forth position inside the mould opening, and also while placing the labels on the inner surface of the mould piece. For instance, if the two labels are positioned at 90° to each other, the gripper units are also adjusted at 90° to each other. In a preferred embodiment of the present invention, the relative positioning of the different surfaces of the gripper units for picking up labels can be adjusted.

Although the inventive concept has been described in considerable detail with reference to certain preferred embodiments and drawings, other embodiments and equivalents are very much possible. Even though numerous characteristics and advantages of the present invention have been set forth in the foregoing description, together with functional and procedural details, the disclosure is illustrative only, and changes may be made in detail, especially in terms of the procedural steps within the principles of the invention to the full extent indicated by the broad general meaning of the expressed terms. Thus various modifications are possible of the presently disclosed system and method without deviating from the intended scope and spirit of the present invention. More particularly, the system and method as depicted in the present invention, is simplified and generalized one and there are several variations possible. Accordingly, in one embodiment, such modifications of the presently disclosed system and method are included in the scope of the present invention.

The invention claimed is:

1. A system for in-mould labelling of a plurality of labels to an article, the system comprising:
   a mould comprises a first mould piece and a second mould piece movable to a closed position and an open position, wherein the mould is casted in a manner such that in the closed position, the mould defines a mould cavity with an inner shape corresponding to an outer shape of the article to be formed in the mould, and in the open position, any surface of the article on which a label is to be applied remains intact within a single mould piece and the mould is dissected along a diagonal axis of the article, wherein a cross section of a body of the article is polygonal in shape such that each mould cavity defines multiple surfaces;
   a preform adjuster and installer mechanism to constantly transport, feed and place a preform in the center of the mould cavity during the open position of the mould in each cycle;
   a magazine unit comprising a first label magazine to hold labels for the first mould piece, and a second label magazine to hold labels for the second mould piece, wherein the first label magazine and the second label magazine are connected by a common base to ensure a fixed relative positioning, and wherein each label magazine comprises a plurality of label clasping mechanisms protruding from them, and each such protruding label clasping mechanism holds a rim of a label at its end and wherein the length and direction of each label clasping mechanism within a label magazine is configured such that the relative positioning of the labels inside the label magazine matches a desired relative positioning of the labels inside the respective mould piece;
   a robotic arm for picking labels from the magazine unit and placing them inside the mould pieces during the open position, wherein the robotic arm comprises a label picker unit with a plurality of channels wherein each channel has a freedom of back and forth movement along an axis of each of the label magazines to the mould pieces, wherein the total width of the travel of all the channels is less than the width of a mould opening to allow entry of all channels inside the mould at the same time;

a plurality of gripper units comprising a first gripper unit and a second gripper unit mounted at the end of each channel, wherein each gripper unit has multiple gripper surfaces equipped and configured to pick one label each from multiple labels in a respective label magazine of the first label magazine and the second label magazine in a manner such that the relative positioning of labels stays intact not only during picking of the label but also during travel of the channel from back to forth position inside the mould opening, and also while placing the labels on inner surfaces of the mould pieces, and wherein at least one of the first gripper unit and the second gripper unit is configured to position a first label on a first surface of a mould cavity of a respective mould piece and a second label on a second surface of the mould cavity of the respective mould piece;

a blowing machine to enable blowing from the preform through the cavity during the closed position of the mould;

wherein, the axis of movement of the channels is selected such that the channels and the labels maintain a distance from the preform in an assembly line as well as inside the mould, to enable simultaneous placement of multiple labels and the preform inside the mould.

2. The system in claim 1 wherein the system is configured for use in a blow-moulding process that is a two-stage blow-moulding process.

3. The system in claim 1 wherein the article is made of polyethylene terephthalate (PET).

4. The system in claim 1 wherein dead space between two labels applied to adjacent surfaces at 90° to each other is less than 5 mm.

5. The system in claim 1 wherein the axis of movement of each channel is towards a non-blowing side of a container and is also horizontally off-centered from the mould opening.

6. The system in claim 1 wherein an inter-se positioning of the gripper surfaces as well as the label clasping mechanisms can be adjusted to match with the desired relative positioning of the labels.

7. A method for in-mould labelling of a plurality of labels to an article, the method comprising:

casting a first mould piece and a second mould piece movable to a closed position and an open position, wherein the mould is casted in a manner such that in the closed position, the mould defines a mould cavity with an inner shape corresponding to an outer shape of the article to be formed in the mould, and in the open position, any surface of the article on which a label is to be applied remains intact within a single mould piece and the mould is dissected along a diagonal axis of the article, wherein a cross section of a body of the article is polygonal in shape such that each mould cavity defines multiple surfaces;

placing the mould pieces inside a blow-moulding machine for the opening and closing of the mould during each cycle at a pre-adjusted frequency and width of mould cavity to constantly transport, feed and place a preform in the center of the mould cavity during the open position of the mould in each cycle;

providing a preform adjuster and installer mechanism to constantly transport, feed and place a preform in the center of the mould cavity during the open position of the mould in each cycle such that air can be blown through the preform during the closed position of the mould;

arranging a magazine unit comprising a first label magazine to hold labels for the first mould piece, and a second label magazine to hold labels for the second mould piece, wherein the first label magazine and the second label magazine are connected by a common base to ensure a fixed relative positioning, and wherein each label magazine comprises a plurality of label clasping mechanisms protruding from them, and each such protruding label clasping mechanism holds a rim of a label at its end and wherein the length and direction of each label clasping mechanism within a label magazine is configured such that relative positioning of the labels inside the label magazine matches a desired relative positioning of the labels inside the respective mould piece;

arranging the direction and positioning of gripper surfaces of a plurality of gripper units comprises a first gripper unit and a second gripper unit mounted at the end of each channel, wherein each gripper unit has multiple gripper surfaces equipped and configured to pick one label each from multiple labels in a respective label magazine of the first label magazine and the second label magazine in a manner such that the relative positioning of labels stays intact not only during picking of the label but also during travel of the channel from back to forth position inside the mould opening, and also while placing the labels on inner surfaces of the mould pieces, and wherein at least one of the first gripper unit and the second gripper unit is configured to position a first label on a first surface of a mould cavity of a respective mould piece and a second label on a second surface of the mould cavity of the respective mould piece;

positioning a robotic arm for picking up labels from the magazine unit and placing them inside the mould pieces during the open position, wherein the robotic arm comprises a label picker unit with a plurality of channels;

mounting the gripper units on the plurality of channels, wherein each channel has a freedom of back and forth movement along an axis of each of the label magazines to the mould pieces;

moving the channels with the gripper units with labels to inside the mould opening and positioning against the corresponding surface of the mould pieces which are to be labelled;

transferring the labels from the gripper units to the inside surface of the mould pieces;

moving the channels with gripper units back to the magazine for the picking labels for the next cycle;

closing the moulds and blowing hot air through the preform; and opening the moulds to let the formed container with in-mould labelling move out of the mould space;

wherein the total width of the travel of all the channels is less than the width of a mould opening to allow the entry of all channels inside the mould at the same time; and wherein the placement of labels as well as placement of the preform inside the mould happens simultaneously in each cycle; and wherein, the axis of movement of channels is selected such that the channels and the labels maintain a distance from the preforms in an assembly line as well as inside the mould, to enable simultaneous placement of multiple labels and the preform inside the mould.

8. The method for in-mould labelling of a plurality of labels to an article as claimed in claim 7 wherein the cross section of the body of the article is polygonal in shape.

9. The method for in-mould labelling of a plurality of labels to an article as claimed in claim 7 wherein the container is made of polyethylene terephthalate (PET).

10. The method for in-mould labelling of a plurality of labels to an article as claimed in claim 7 wherein dead space between two labels applied to adjacent surfaces at 90° to each other is less than 5 mm.

11. The method for in-mould labelling of a plurality of labels to an article as claimed in claim 7 wherein the axis of movement of each channel is towards the non-blowing side of the container and is also horizontally off-centered from the mould opening.

* * * * *